United States Patent [19]
Boyles et al.

[11] Patent Number: 5,602,535
[45] Date of Patent: Feb. 11, 1997

[54] VEHICLE SECURITY SYSTEM BASED ON TWO STEP COMMUNICATION RANGE BETWEEN TRANSMITTER AND RECEIVER

[75] Inventors: William E. Boyles; Philip G. Burger; David S. Chang, all of Houston, Tex.

[73] Assignee: The Friedkin Corporation, Houston, Tex.

[21] Appl. No.: 275,592

[22] Filed: Jul. 15, 1994

[51] Int. Cl.$^6$ .................................................. H04Q 1/00
[52] U.S. Cl. ........................... 340/825.31; 340/825.69; 307/10.1; 307/10.4
[58] Field of Search ................. 340/825.31, 825.69, 340/825.72; 307/10.1, 10.3, 10.4, 10.6

[56] References Cited

U.S. PATENT DOCUMENTS

| | | | |
|---|---|---|---|
| 3,760,422 | 9/1973 | Zimmer et al. | 340/825.69 |
| 4,918,431 | 4/1990 | Borras | 340/825.31 |
| 5,086,290 | 2/1992 | Murray et al. | 340/539 |
| 5,109,221 | 4/1992 | Lambropoulos et al. | 340/825.31 |
| 5,355,525 | 10/1994 | Lindmayer et al. | 340/825.69 |
| 5,379,033 | 1/1995 | Fujii et al. | 340/825.31 |
| 5,479,156 | 12/1995 | Jones | 340/825.31 |

FOREIGN PATENT DOCUMENTS

| | | | |
|---|---|---|---|
| 5153664 | 6/1993 | Japan | 340/825.72 |

*Primary Examiner*—Brian Zimmerman
*Attorney, Agent, or Firm*—Vinson & Elkins L.L.P.

[57] ABSTRACT

An apparatus and method allowing a first communication distance between transmitter and receiver for substandard short range control of a vehicle security module, and a second communication distance between transmitter and receiver for standard long range control of the vehicle security module. In this manner, the receivers of numerous vehicles may be programmed all to respond to the same common code, and the short range control used to activate only the vehicle(s) immediately proximate a short range transmitter. Thereafter, the receiver of a selected vehicle may be programmed to respond to a unique code, and the long range control used to activate the receiver of the selected vehicle at a longer distance from a long range transmitter.

11 Claims, 7 Drawing Sheets

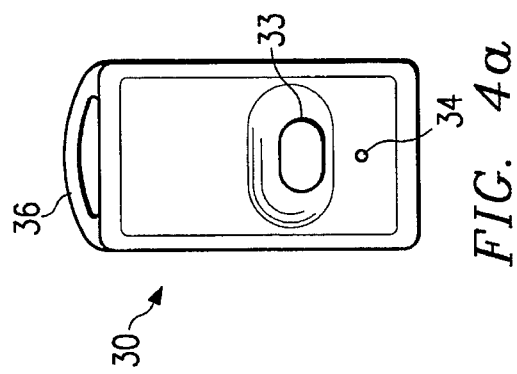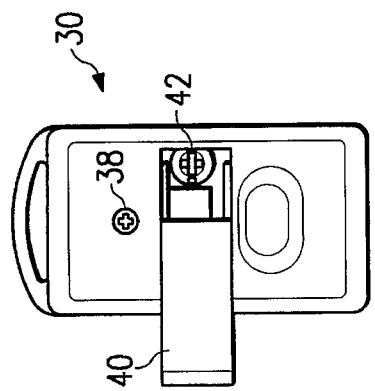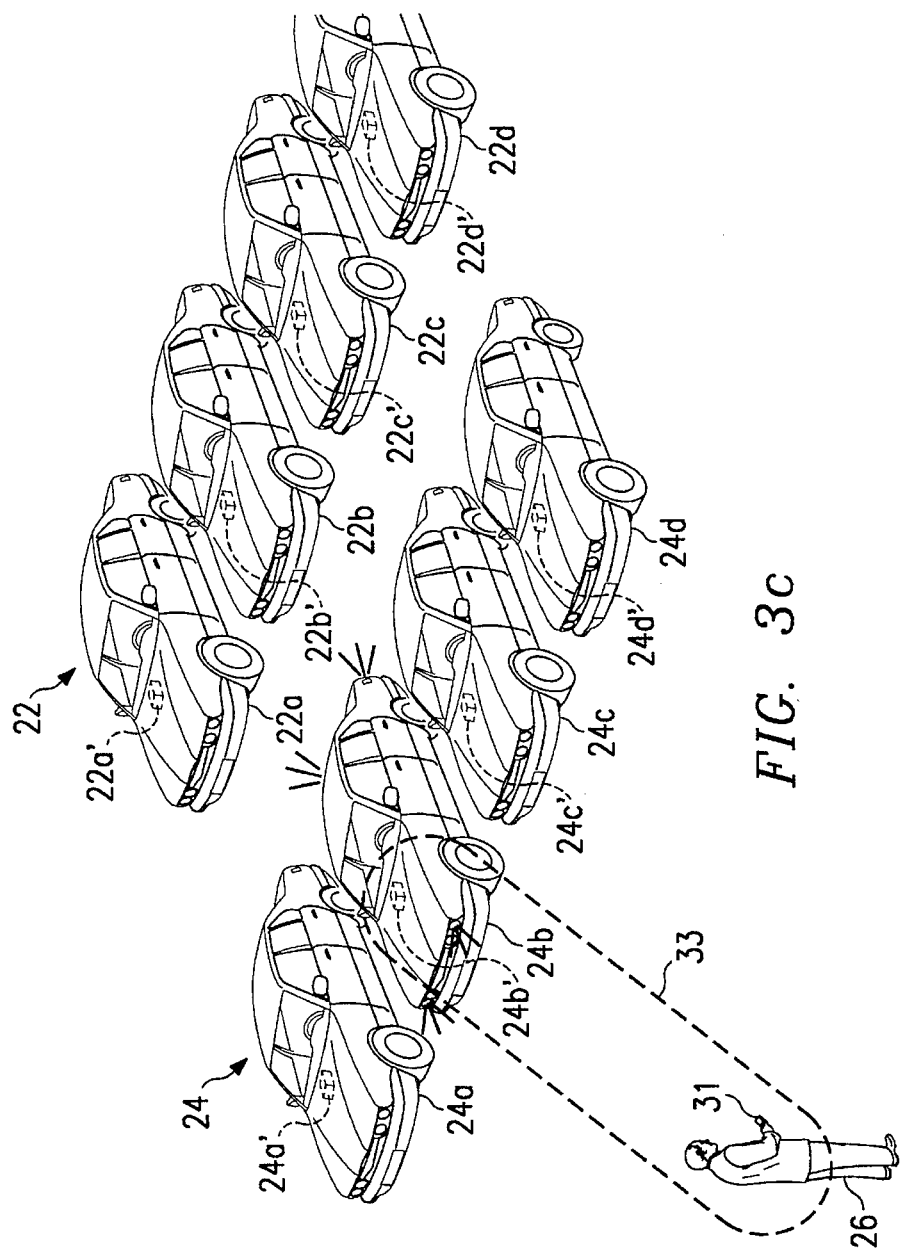

VEHICLE SECURITY SYSTEM BASED ON TWO STEP COMMUNICATION RANGE BETWEEN TRANSMITTER AND RECEIVER

This invention relates to vehicle security systems, and is more particularly directed to an apparatus and method allowing a first communication distance between transmitter and receiver for short range control of a vehicle security module, and a second communication distance between transmitter and receiver for long range control of the vehicle security module.

BACKGROUND OF THE INVENTION

The present invention is directed to vehicle security systems, such as those providing alarms, vehicle starter disablement, door locking/unlocking, and other features of the system which are controlled by remote control transmitters. As known in the art, these systems use a transmitter to arm and/or disarm one or more of the features of the vehicle security system.

FIG. 1a illustrates a perspective view of a typical prior vehicle security system. In FIG. 1a, a user 10 is shown holding a transmitter 12. Transmitter 12 operates in conjunction with a security module 14 in a vehicle 16, such as an automobile. In FIG. 1a, security module 14 is shown by dashed lines to indicate interior placement, with it understood that various types of placement, such as under the dash or hood, are known in the art.

The operation of the system of FIG. 1a is illustrated in FIG. 1b. Particularly, in FIG. 1b, user 10 depresses a button (not shown) on transmitter 12 to arm or disarm security module 14, and its related features. More particularly, when the button on transmitter 12 is depressed, transmitter 12 transmits a signal, typically either an analog or digital code at a radio frequency. For purposes of document, any type of communication from the transmitter will be collectively referred to as a "code." The code is received by a receiver (not shown) which is typically within the housing of security module 14. If the transmitted code matches the code expected by the receiver, security module 14 responds appropriately, that is, to arm or disarm the security system, or possibly to activate additional or alternative features such as door locking/unlocking, trunk unlocking, remote vehicle start, and the like. In addition, security module 14 is often connected to various vehicle components to confirm that the code from transmitter 12 has been received and that the security system is armed or disarmed in response to the transmitted code. Thus, in FIG. 1b, the exterior lights 18 and 20 of vehicle 16 flash to indicate that the valid code is received by security module 14. In addition, the vehicle horn or a separately provided audio device often sounds to confirm receipt of the valid code from transmitter 14.

Note that various types of communication between transmitter and receiver for vehicle security systems are known in the art, or will be developed in the future, and the above is merely an example of that known by a person skilled in the art. In each instance, however, there is communication between a transmitter 12 and a receiver, the latter typically included in security module 14.

Given the prior art description above, the present invention recognizes at least one inherent limitation of known vehicle security systems, particularly in the context of vehicles sales. Specifically, a vehicle dealer often has an entire lot of vehicles, each having its own separate transmitter/receiver system such as that shown in FIGS. 1a and 1b. Consequently, when a potential purchaser wishes to see the interior of a vehicle, take it for a test drive, or similar activity, the salesperson must locate the specific transmitter which corresponds to the security system in the vehicle of interest. This effort is time consuming and distractive to both the salesperson and consumer. Moreover, the dealer often must maintain a complex and cumbersome system for correlating each of the transmitters to a corresponding vehicle. If transmitters get mixed up, the salesperson may suffer additional hardship in obtaining a new transmitter which will disarm a previously armed security system. Other difficulties and hassles are equally appreciated by one faced with the prior art system.

It is therefore an object of the present invention to provide an apparatus and method for enhancing the use of vehicle security systems.

It is a further object of the present invention to provide such an apparatus and method for minimizing the hardship and expense on vehicle dealers having multiple vehicles equipped with remotely-controlled vehicle security systems.

It is a further object of the present invention to provide such an apparatus and method allowing a first communication distance between transmitter and receiver for substandard short range control of the vehicle security system.

It is a further object of the present invention to provide such an apparatus and method allowing a second communication distance between transmitter and receiver for standard long range control of the vehicle security system.

Still other objects and advantages of the present invention will become apparent to those of ordinary skill in the art having references to the following specification together with its drawings.

SUMMARY OF THE INVENTION

In the preferred embodiment, the present invention includes an apparatus and method allowing a first communication distance between transmitter and receiver for substandard short range control of a vehicle security module, and a second communication distance between transmitter and receiver for standard long range control of the vehicle security module.

In one method embodiment, there is a method of selectively controlling a vehicle alarm system comprising a transmitter and a security module operable in response to a control code from the transmitter. The method comprises various steps. First, from a transmitter having a sufficient power source, a control code is transmitted with the transmitter. Second, the method responds to the control code with the security module only if the security module is within a predetermined distance of the transmitter, wherein the predetermined distance is a substandard distance, that is, a distance significantly less than the standard distance for currently available vehicle system security systems.

In one apparatus embodiment, a transmitter transmits a control code an effective distance, wherein the effective distance is a distance for which the control code controls a vehicle alarm system. The transmitter comprises user means operable by a user for commencing the control code. The transmitter also comprises circuitry for limiting the effective distance of the control code. Finally, the transmitter comprises circuitry for generating the control code in response to operation of the user means, and limited to the effective distance.

BRIEF DESCRIPTION OF THE DRAWINGS

For a more complete understanding of the present invention, and the advantages thereof, reference is now made to the following description taken in conjunction with the accompanying drawings, in which:

FIG. 1b illustrates a user operating the prior art vehicle security system of FIG. 1a;

FIG. 3b illustrates a user operating the improved vehicle security system of FIG. 3a;

FIG. 3c illustrates a user operating a second transmitter having a sufficient power source to communicate a second control code a standard distance wherein the security module of the single intended vehicle has been reprogrammed to respond to a second control code and not respond to an identical common code.

FIG. 4a illustrates a top view of the improved transmitter in accordance with the present invention;

FIG. 4b illustrates a bottom view of the improved transmitter in accordance with the present invention;

DETAILED DESCRIPTION OF THE PREFERRED EMBODIMENTS

The preferred embodiment of the present invention and its advantages are best understood by referring to FIGS. 1–6 of the drawings, like numerals being used for like and corresponding parts of the various drawings.

The present invention sets forth an apparatus and method for addressing the above-described problems, and applies to other vehicle protection system concerns as well. In a first aspect of the invention, the receivers corresponding to a group of vehicles are all adapted to respond to a single code. To accomplish this aspect in the preferred embodiment, the programmability of many currently known vehicle security systems is used. Such systems include programmable transmitters and receivers wherein both transmitter and receiver can be adjusted in some manner to communicate a given code. For example, some systems use a "learning mode." First, the receiver is placed in the learning mode. Second, the transmitter is actuated to send a code, and this code is "learned" by the receiver. Thereafter, the receiver responds only to the learned code and not to other codes. Thus, using the programmability of these systems, in the preferred embodiments, each vehicle on the lot (or group of vehicles of interest) is configured to learn the same single code. Thereafter, one or more transmitters are provided which all output the single common code. Consequently, a person seeking access to a vehicle may use any of the one or more common-code transmitters to arm/disarm any of the common-coded receivers and, thereby, avoid having to a locate a specific single transmitter corresponding to a single specific receiver.

Figure 1A:
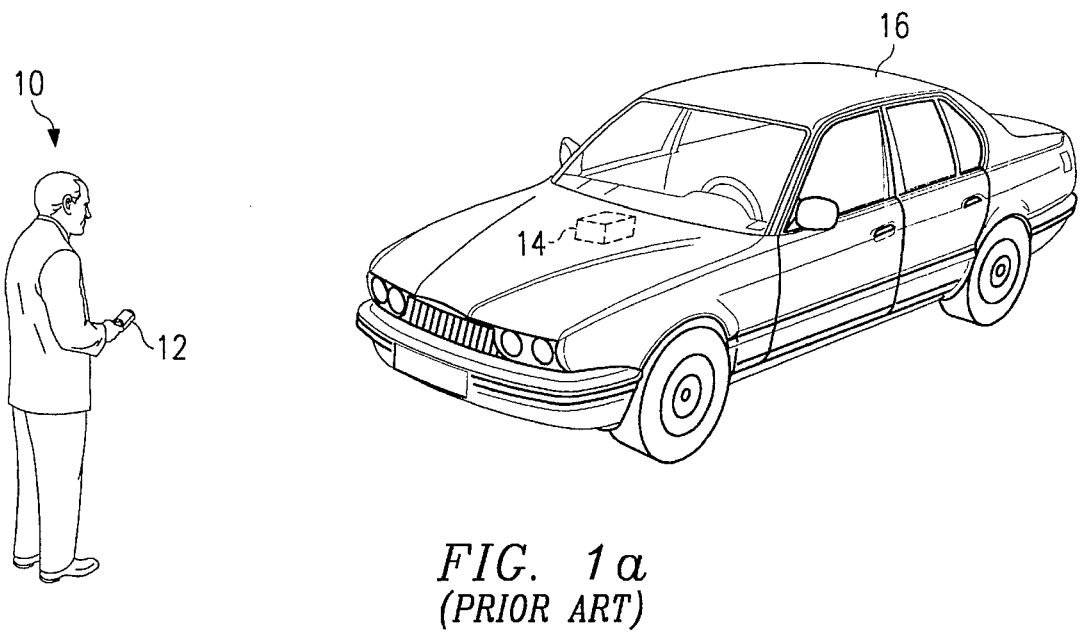
FIG. 1a illustrates a prior art vehicle security system with a transmitter to control the receiver of a vehicle security module.
Figure 1B:
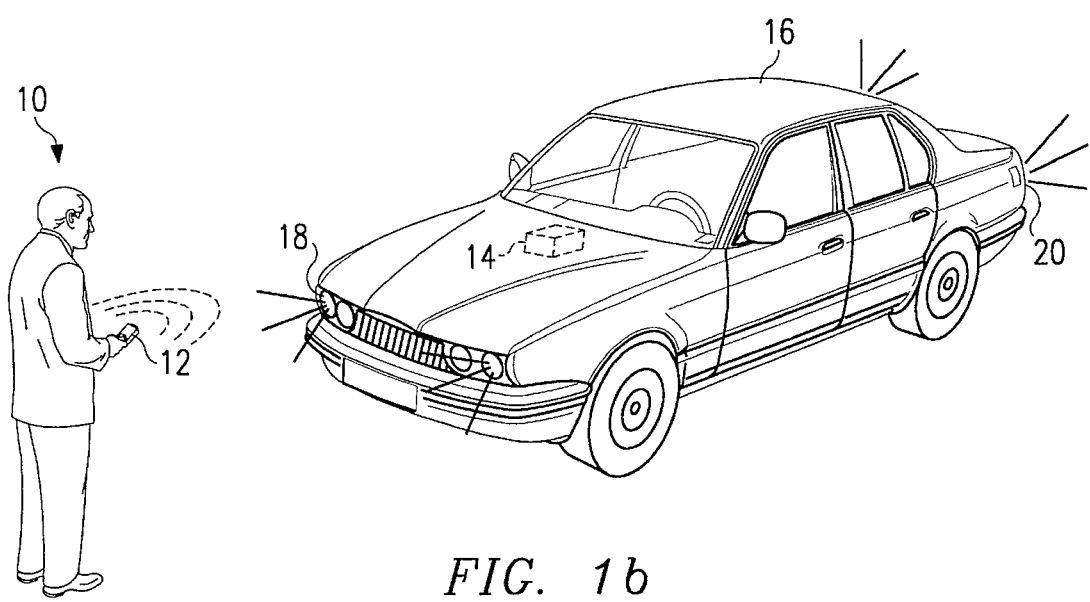
Figure 2A:
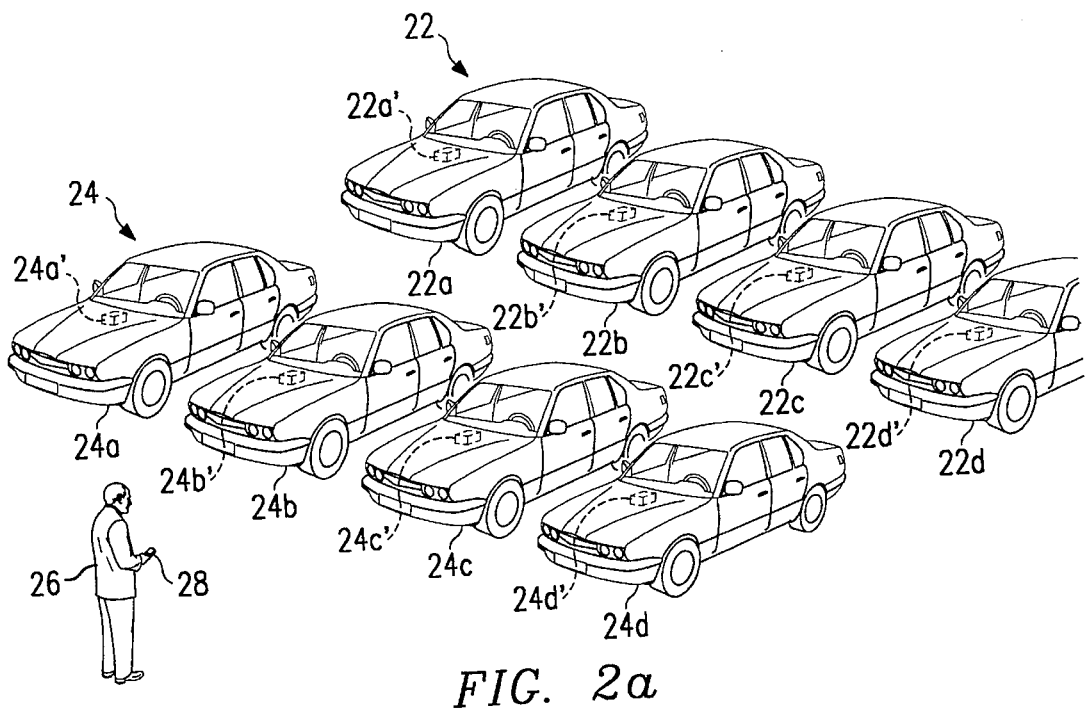
FIG. 2a illustrates one aspect of the present invention wherein the security modules of multiple vehicles are configured to respond to an identical common code.
Figure 2B:
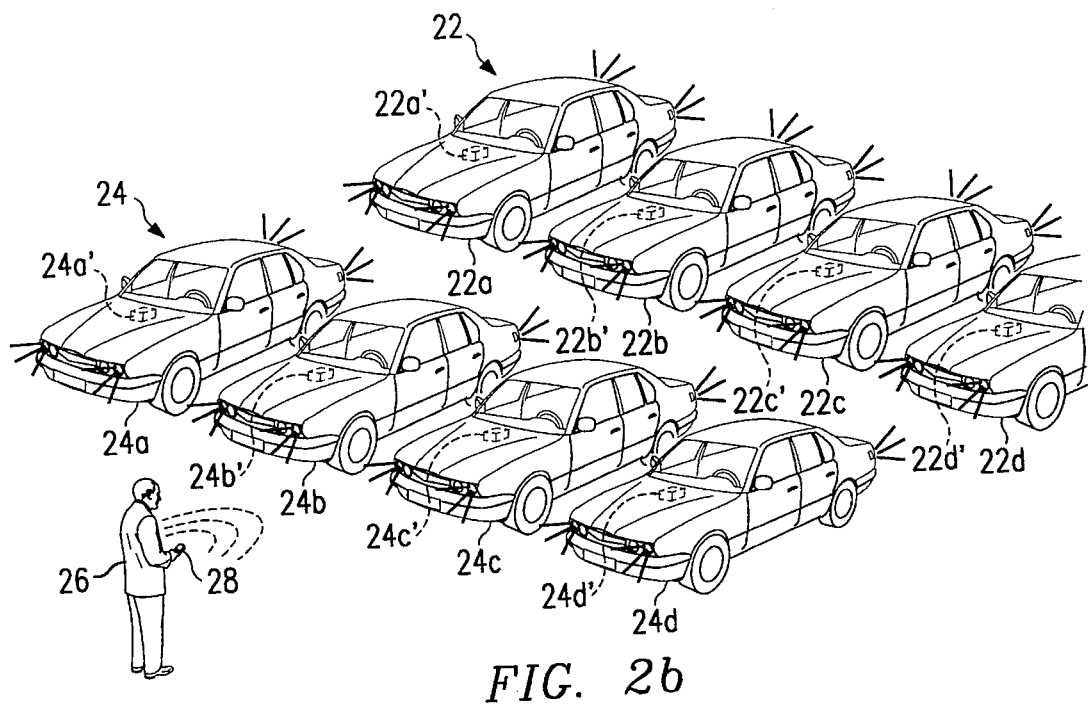
FIG. 2b illustrates a problem wherein a user operates a transmitter which inadvertently controls the receivers of numerous vehicle security modules rather than the security module of the single intended vehicle.

While the above aspect of the invention eliminates the need for correlation between separate transmitters and receivers, it adds additional concerns which are further addressed by additional aspects of the invention. Particularly, FIGS. 2a–2b illustrate a drawback of the stated concept when implemented with no further modification. In FIG. 2a, two rows of vehicles are shown, designated generally as rows 22 and 24. Each vehicle within a row is further represented with a reference letter combined with the row identifier, so that the four vehicles along row 22 are 22a through 22d, and the four vehicles along row 24 are 24a through 24d. The vehicles of rows 22 and 24 are assumed to be parked in a fashion such as that typically used in a dealer lot, whereby each vehicle is roughly six feet apart from another vehicle along its side. Further, row 22 is approximately fifteen feet from row 24.

In practice of the above-described aspect of the invention, each vehicle in rows 22 and 24 has a security module shown generally in the interior of the vehicle, and labeled by placing an apostrophe after the vehicle identifier. For example, vehicle 22a includes a security module 22a', vehicle 22b includes a security module 22b', and so forth. Each security module has a receiver as in the prior art, but in accordance with one aspect of the invention, each receiver is adapted to respond to the same common code of a transmitter (as opposed to differing codes for differing transmitters). Thus, a user 26 is shown possessing a transmitter 28, with it understood that transmitter 28 is configured to transmit the single common code to arm/disarm any vehicle along rows 22 and 24.

FIG. 2b illustrates the operation of the system shown in FIG. 2a, as well as a potential drawback if the stated concept is implemented with no further modification. Assume that user 26 wishes to disarm vehicle security module 24b' of vehicle 24b. Thus, user 26 depresses the button (not shown) on transmitter 28 to accomplish this result. Next, security module 24b' of vehicle 24b responds, and this is shown in FIG. 2b by a flash of the exterior lights of vehicle 24b.

However, in the current vehicle protection art, it is well-known that great efforts have been made to expand the range of transmission for transmitters of the type used for transmitter 28. For example, under current technology, a transmitter such as transmitter 28 sends its signal along a standard range of 20 to 75 feet. Thus, when user 26 actuates transmitter 28 to disarm security module 24b' of vehicle 24b, the signal transmitted by transmitter 28 is also received by the security modules of each of the other vehicles in rows 22 and 24. Because these modules are all programmed to respond to the same code as vehicle 24b, and because the transmission distance of transmitter 28 is strong enough to reach each of those vehicles, all of the vehicles' security modules, in addition to that of vehicle 24b, respond by disarming. Consequently, while user 26 intended to only disarm security module 24b' of vehicle 24b, the user unintentionally disarms the modules all of vehicles 22a–d and 24a, 24c, and 24d.

Clearly, the above result may be undesirable in various circumstances. For example, many vehicle security modules currently include door lock/unlock features whereby the vehicle doors automatically lock at roughly the same time the module is armed, and automatically unlock at roughly the same time the module is disarmed. Thus, in the example of FIG. 2b, user 26 has unintentionally unlocked all of the vehicles shown rather than just vehicle 24b. Consequently, access is accidentally granted to vehicles other than vehicle 24b which may be troublesome, costly, or even dangerous. For example, a vandal or thief could have access to a vehicle which is fifty or more feet away, and might also be beyond the view of user 26. The accidental arming/disarming of a distant vehicle could have other implications as well. As another example, some newer vehicle security systems also permit the transmitted signal to start the vehicle engine. It is quite possible that a user such as user 26 would not want to start the engines of all the vehicles of rows 22 and 24 when only interested in starting the engine of vehicle 24a. Still other concerns and problems of unintentionally controlling remotely-located vehicles will be appreciated by persons skilled in the art.

Given the above, an additional aspect of the present invention includes a novel transmitter for use with a vehicle security system, where the novel transmitter is specifically capable of having a limited range of transmission. Thus, the transmitter is purposefully designed to limit its effective transmission distance to a substandard transmission range which, as described below, is preferably on the order of six feet. Different techniques may be employed to limit the range of transmission, with the preferred embodiment discussed in greater detail below.

Figure 3A:
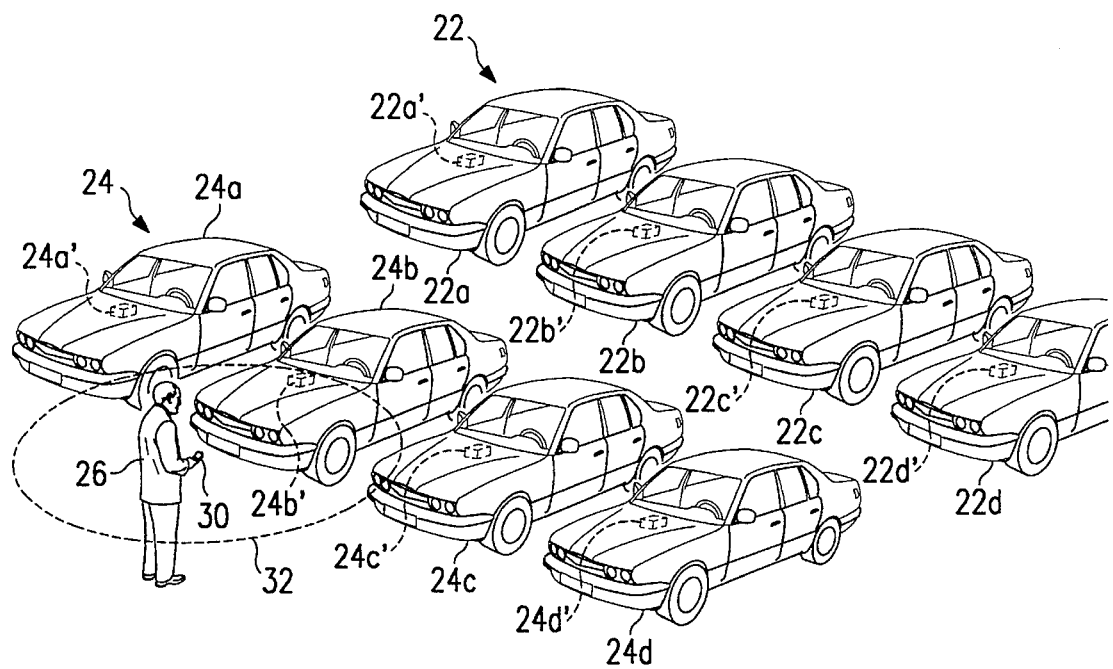
FIG. 3a illustrates the rows of vehicles of FIGS. 2a and 2b, but with a user possessing an improved transmitter in accordance with the present invention.
Figure 3B:
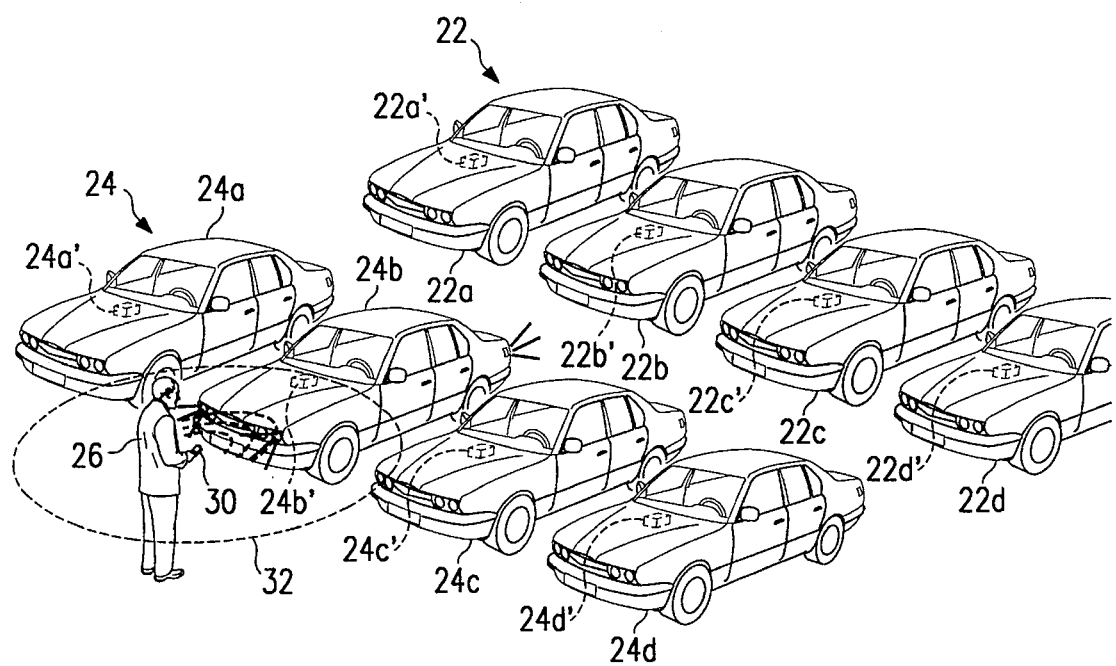

FIGS. 3a–3c illustrate the effect of implementing the novel transmitter discussed above. Once again, FIG. 3a illustrates user 26 and the rows 22 and 24 of vehicles as in FIGS. 2a and 2b. However, user 26 possesses an improved transmitter 30, wherein the improvement is an intended limit on the range of transmission. As a result, a substandard range of transmission is shown by a circle labeled 32 and having a diameter equal to the substandard range. The length of the substandard range 32 is preferably set to a distance which will only reach a single security module immediately proximate the transmitter being operated. As stated above, vehicles on a lot are typically six feet apart from one another and, thus, a preferable limit on substandard range 32 is on the order of six feet. Clearly, however, substandard range 32 could be adjusted in accordance with the teachings described herein.

FIG. 3b illustrates the beneficial result achieved given the limit imposed by substandard range 32. Particularly, assume again that user 26 desires to disarm security module 24b' of vehicle 24b. Thus, user 26 actuates transmitter 30 in the necessary fashion, and security module 24b' responds as shown (as an example) by flashing exterior lights in FIG. 3b. However, in stark contrast to the action in FIG. 2b, substandard range 32 causes the transmitted code to only affect security module 24b' of vehicle 24b. Thus, while an attenuated signal might reach other vehicles, such a reduced signal is ineffective to affect the security modules of vehicles outside the limit imposed by substandard range 32. Consequently, the intended action (e.g., disarming an alarm, unlocking the doors, etc.) occurs only at the intended vehicle 24b, with the security modules of the remaining vehicles left unaffected by the transmission. Thus, in this aspect of the invention, only the security system of the vehicle immediately proximate user 26 is affected, while those vehicles beyond the range of substandard range 32 are not.

Given the above, note that the term "substandard" is used herein to limit the effective transmission distance of transmitter 30, that is, the distance away from transmitter 30 for which a typical receiver will respond. By labeling the distance "substandard," this aspect of the invention means that the limited distance is significantly less than the standard distance for currently available vehicle system security systems. As stated above, under current technology, a transmitter such as transmitter 28 can successfully communicate its code along a standard range of 20 to 75 feet for use in an environment where different vehicles have different security system codes. In contrast, a substandard distance is a distance significantly less than 20 feet. While the example of zero to six feet is provided, clearly the substandard distance need not be precisely defined in dimensions, thereby allowing for adjustment while remaining within the spirit of the intended invention. For example, if the substandard distance is set to one foot, user 26 in FIG. 3 would have to stand much closer to vehicle 24b in order to have its security module 24b' respond. Further, by reducing the substandard distance from six feet to one foot, there is also the reduced possibility that the security module of a nearby vehicle (e.g., 24a or 24c) will respond to the transmission by transmitter 30.

FIGS. 4a and 4b illustrate a top and bottom view, respectively, of the preferred embodiment of transmitter 30. With reference to FIG. 4a, transmitter 30 is preferably constructed of a plastic body which is relatively small in size, such as 1.75 by 1.0 by 0.5 inches in dimension. Transmitter 30 includes a depressible button 33 which a user can press to transmit the above-described code. Transmitter 30 also includes an indicator 34, such as an LED, which illuminates when button 33 is depressed, thereby indicating that transmitter 30 has a sufficient power source and is transmitting the necessary code. Note in the current embodiment the power source is a nine volt battery, but is likely to be modified to accommodate nickel cadmium power in the future. Transmitter 30 also includes a handle 36 for connecting to a keychain or the like.

With reference to FIG. 4b, transmitter 30 includes a fastener 38, such as a screw, for holding the top and bottom portions of the transmitter together, and for removal to permit access to the power source and circuitry located within the transmitter interior. In yet another aspect of the present invention, transmitter 30 is manufactured to have a variable range of transmission, between zero feet and the limit of the substandard range. Thus, in the preferred embodiment, transmitter 30 is adjustable so that its range of transmission is between zero and six feet. Toward that end, transmitter 30 includes a slidable door 40 which, when opened, allows access to a rotatable member 42, such as an internal screw, which can be turned to adjust the transmission distance between zero and six feet (or whatever range is appropriate). Thus, by turning rotatable member 42, a user of transmitter 30 can adjust the diameter of the circle 32 shown in FIGS. 3a and 3b to whatever distance is desirable.

Given the description above, still another aspect of the present invention is its applicability to an overall system for use in the sales or control of groups of vehicles. In the example of sales, the dealer purchases numerous standard range prior art transmitters and numerous security modules, as discussed in connection with FIGS. 1a and 1b. Initially, each individual standard range transmitter may (or may not) be programmed to correspond to a respective receiver, or numerous programmable standard range transmitters and receivers may be obtained which are not yet programmed, but such that a given transmitter may later be programmed to operate a given receiver. However, the dealer also obtains a minimum number of transmitters such as transmitter 30, which are hereafter referred to as "specialized" transmitters. As appreciated below, the number of necessary specialized transmitters preferably corresponds to the number of salespersons, or the number of vehicles which will likely need to be accessed at once.

When a dealer adds a for-sale vehicle to his/her fleet, a security module is installed in the vehicle. Next, the security module is configured, such as by the learning mode described above, to respond to the same common code which is already recognized by the other forsale vehicles on the lot. Thus, the added vehicle, as well as the others on the dealer lot, are accessible by one or more of the specialized transmitters, which are likewise configured to transit the appropriate common code.

When a potential purchaser desires access to a vehicle, such as for inspection or a test drive, a salesperson can grab any of the specialized transmitters and approach the vehicle in question. Once the salesperson is within the substandard range of the vehicle's security module (e.g., within six feet of the module) the salesperson actuates the specialized transmitter, thereby disarming the vehicle's security module and/or affecting other security system features. Because the transmission range of the specialized transmitter is limited, however, the other vehicles on the lot remain unaffected by this operation.

If the potential purchaser decides to purchase a particular vehicle, in the preferred embodiment, one of the prior art standard range transmitters for such vehicle is preferably retrieved and the standard range transmitter and vehicle security module are then re-programmed to communicate using a different code. Thus, after purchase, the buyer is free to use the standard range transmitter, which of course transmits over a standard distance (e.g., 20 to 75 feet), to arm/disarm the security module of the newly purchased vehicle. For example, FIG. 3c illustrates a user 26 operating a second transmitter 31 having a sufficient power source to communicate the different code a standard distance 33. The security module of vehicle 24b has been re-programmed to respond to the different control code. Due to the re-programming, the standard range transmitter will not affect the remaining vehicles on the lot because the security modules in those vehicles only respond to the earlier-programmed common code, rather than the re-programmed code of the newly purchased vehicle.

Note that an alternative method and apparatus embodiment to the above is to construct the specialized transmitter so that it may be adjusted to either a substandard or a standard range of transmission. Thus, transmitter 30 could have a range of zero feet all the way up to a standard distance, and be "tuned" downward to a substandard distance for purposes of performing the method illustrated in connection with FIGS. 3a and 3b. Given this alternative method embodiment, the tuned-down transmitter would be used to transmit a code the substandard distance described above. Thereafter, two adjustments are made at time of purchase. First, the specialized transmitter is tuned upward so that it is no longer limited to the substandard range; thus, the new vehicle owner may use the specialized transmitter in the same manner as a prior art standard range transmitter, namely, to control the security system from a standard range of 20 to 75 feet. Second, the specialized transmitter is re-programmed in the same manner as described above, so that it communicates a unique code to the security module of the newly purchased vehicle which also has been re-programmed to respond to the new code.

The above-described alternative embodiment is beneficial in that only one type of transmitter (i.e., the specialized transmitter) is necessary. Moreover, a recent, but unfortunate, development in vehicle theft has been for thieves to hide in areas such as parking lots, and use electronic equipment to record or "intercept" the code of an innocent user when the user operates his/her transmitter to arm their vehicle. Thereafter, the user typically leaves the vehicle so to go shopping or the like. Next, the thief programs his/her own transmitter to match the intercepted code, and then has the ability to disarm the user's vehicle. Under the embodiment above, however, the user can tune downward the range of transmission and only arm the vehicle by standing immediately proximate to it; as a result, the signal does not reach the intercepting equipment of the thief and, hence, the thief is thwarted.

Figure 5:
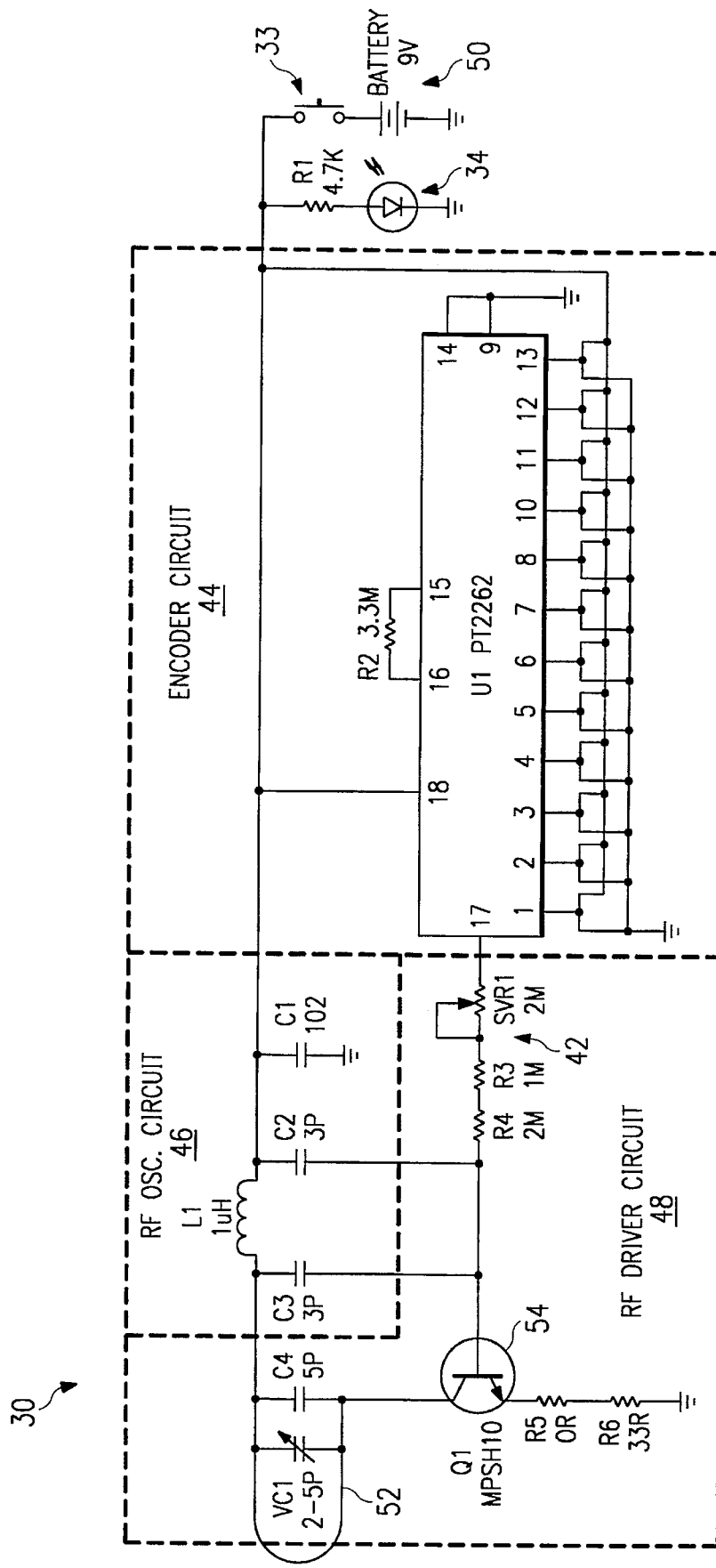
FIG. 5 illustrates a schematic of one embodiment of the transmitter shown in FIGS. 4a and 4b.

The following description and FIG. 5 addresses one embodiment for limiting the transmission distance of transmitter 30; however, it should be understood that any other techniques known in the art, or developed by a person having skilled in the art without undue experimentation, also may apply. In each instance, a transmitter is created which transmits a substandard distance given a sufficient power source. By sufficient power source, it is meant to distinguish the present invention from a transmitter that inadvertently has a limited transmission range because its power source has dwindled. Under the present invention, the transmitter is intentionally designed so that at its sufficient or acceptable power source, and given some level of tolerance (e.g., nine volts plus or minus one volt), the transmitter transmits a code only a given distance, and that distance is substandard in the vehicle remote control art.

FIG. 5 illustrates a schematic of the one embodiment of transmitter 30. Transmitter 30 generally includes an encoder circuit 44, an oscillator circuit 46, and a radio frequency ("RF") driver circuit 48. FIG. 5 further illustrates the schematic components for depressible button 33 and indicator 34. Lastly, transmitter 30 is operable to connect to a power source, which in the illustrated embodiment is a nine volt battery 50.

Encoder circuit 44 includes a PT2262 chip which is commercially available from PTC. Pin 18 of the PT2262 chip receives voltage from battery 50 when button 33 is depressed. Further, as known in the art, the PT2262 chip is operable in a transmitter circuit configuration to output a digital code. More particularly, pins 1 through 13 of the PT2262 chip are initially connected as shown, but such connections are selectively broken to define the particular code to be transmitted. Consequently, the transmitter is capable of transmitting any of $2^3$ different codes.

Oscillator circuit 46 includes various components to establish a frequency of oscillation for a carrier signal to carry the code output by the PT2262 chip. In oscillator circuit 46, the components illustrated, and their respective values, demonstrate the illustrated embodiment, with it understood that other values and/or components could be selected by a person skilled in the transmitter art.

RF driver circuit 48, in combination with the PT2262 chip, provides the modulated code, which is transmitted using the carrier signal at a node 52. This output signal is preferably connected to a transmission medium, such as antenna, according to known transmitter principles. In RF driver circuit 48, the components illustrated, and their respective values, demonstrate the illustrated embodiment, with it understood that other values and/or components could be selected by a person skilled in the transmitter art. Note that RF driver circuit 48 includes schematically the corresponding device for rotatable member 42 discussed in connection with FIG. 4b, above. Thus, in this embodiment, rotatable member 42 corresponds to a potentiometer which operates in the fashion described below. Note also that the embodiment includes a transistor 54 having its base coupled through two resistors to potentiometer 42.

The general operation of the schematic of FIG. 5 is as follows. When a user wishes to transmit a code to a security receiver, the user depresses button 33 and holds it in place. Consequently, a voltage is applied to LED indicator 34 causing it to illuminate, as well as to the PT2262 chip. The PT2262 chip outputs a digital code at pin 17 (again, the code depends on the number of broken connections at pins 1–13). Potentiometer 42, however, limits the voltage swing applied to the base of transistor 54. As a result, the higher the resistance of potentiometer 42, the lower the voltage swing applied to the base of transistor 54. As known in the art, by lowering the base voltage to transistor 54, the output voltage swing at node 52 is also reduced. Thus, one skilled in the transmitter art will readily appreciate that adjustment of rotatable member 42 in FIG. 4b (or schematically as a potentiometer in FIG. 5) limits the voltage swing to the amplifying transistor 54 and, thus, limits the range of transmission distance of transmitter 30.

Figure 6:
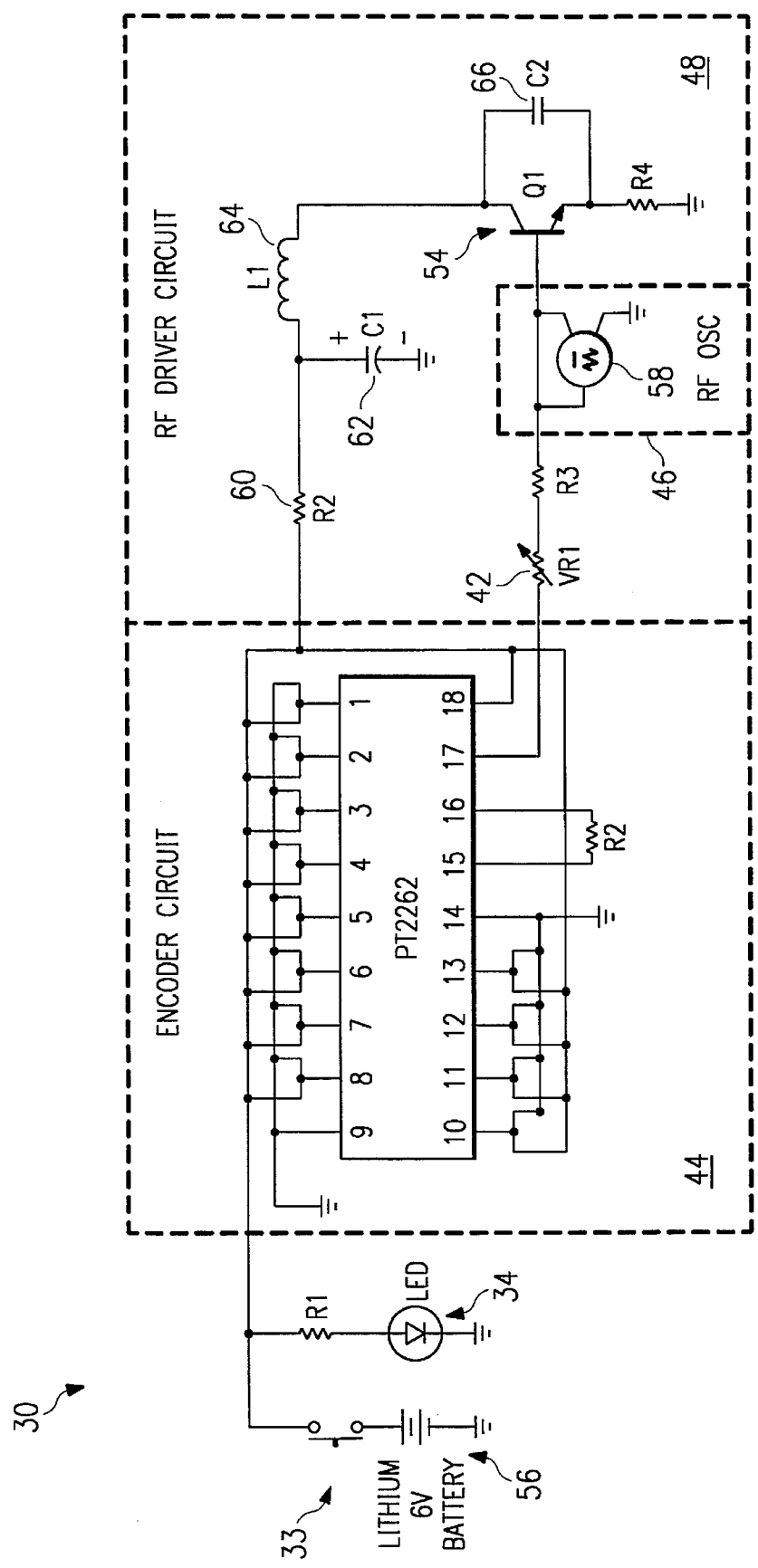
FIG. 6 illustrates a schematic of the preferred embodiment of the transmitter shown in FIGS. 4a and 4b.

FIG. 6 illustrates a schematic of the preferred embodiment of transmitter 30. The embodiment of FIG. 6 is similar to that of FIG. 5 and, thus, generally includes an encoder circuit 44, an oscillator circuit 46, and a radio frequency ("RF") driver circuit 48. FIG. 6 further illustrates the schematic components for depressible button 33 and indicator 34. The power source in the preferred embodiment, however, is a lithium six volt battery 56.

Encoder circuit 44 is the same as the embodiment of FIG. 5 and, thus, includes a PT2262 chip having connections which are selectively broken to define the particular code to be transmitted.

Oscillator circuit 46 again includes components to establish a frequency of oscillation for a carrier signal, but in the preferred embodiment, the oscillating component is a quartz crystal oscillator 58 instead of an LC oscillator as in the case of FIG. 5.

RF driver circuit 48 again includes components to function as its counterpart of FIG. 5, with some alterations. Particularly, circuit 48 includes an RLC combination comprising a resistor 60, a capacitor 62, and an inductor 64 to provide the antenna function for transmitting the modulated code. In addition, again a transistor 54 is provided, but further includes a filtering capacitor 66 coupled between its collector and emitter. Note again that RF driver circuit 48 includes schematically the corresponding device for rotatable member 42 discussed in connection with FIG. 4b, above. Thus, in the preferred embodiment, rotatable member 42 corresponds to a potentiometer which operates in the fashion described above in connection with FIG. 5, that is, by limiting the voltage swing to the base of transistor 54.

In view of the above, the general operation of the schematic of FIG. 6 is similar to that of FIG. 5. Thus, a user depresses button 33 and consequently transmits a modulated code with a voltage amplitude swing dependent on the setting of potentiometer 42. One key distinction in FIG. 6, however, is that quartz crystal oscillator 58 provides additional stability when transmitting the modulated code. Particularly, it has been determined that the frequency of oscillation of the carrier signal may vary slightly in the embodiment of FIG. 5, while the preferred embodiment of FIG. 6 provides little or no change in such frequency.

Having shown the preferred implementation of transmitter 30, note that other alternatives may be chosen, or developed, by a person skilled in the art to limit the distance of transmission. For example, the pulse width of a digital code may be adjusted so that it diffuses at a certain level and, thus, is only recognized by a receiver within a given distance. Other examples are known or will become apparent. Note also that no particular implementation need be described regarding the security modules or receiver apparatus described herein. Suffice it to mention that numerous programmable transmitters, receivers, and/or security modules are well-known in the art and are commercially available from various sources.

Figure 7:
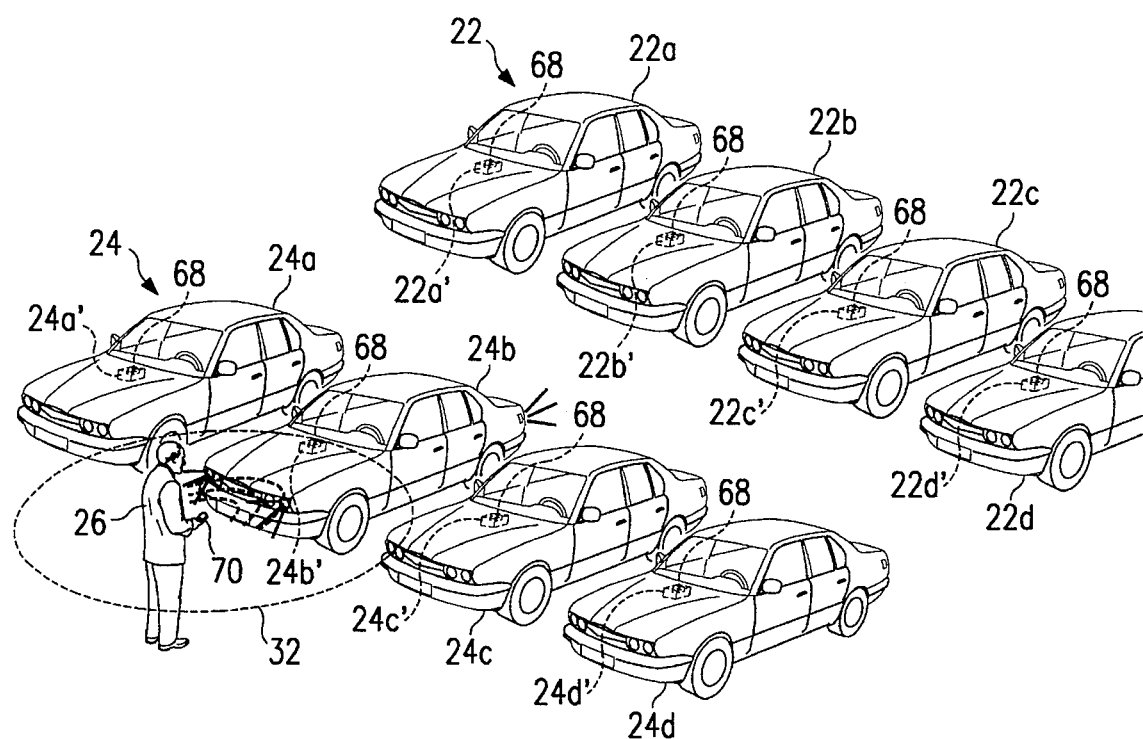
FIG. 7 illustrates a row of vehicles with improved receivers in accordance with the present invention.

From the above, it may be appreciated that the embodiments of the present invention provide components, methods, and an overall system for enhancing vehicle security systems. Numerous embodiments of both apparatus and methodology have been discussed by way of example. However, while the present invention has been described in detail, various substitutions, modifications or alterations could be made to the descriptions set forth above without departing from the inventive scope. Indeed, numerous examples are set forth above of the flexibility of the inventive aspects. As yet another example, while the invention has been described in the context of sales of vehicles, it also may apply in other contexts, such as where a business has a large fleet of vehicles and desires to control more than one vehicle with a single transmitter, but only one of those vehicles at a time, or more than one vehicle which is immediately proximate the controlling transmitter. As still another example, as an alternative to limiting the range of transmission of a transmitter, one skilled in the art may attenuate the sensitivity of a receiver instead, such as by placing shunts in-line on the receiving device so that shunted systems respond to transmitters only if they are immediately proximate the shunted system. Thus, again, the communication path between transmitter and receiver is limited, thereby providing many of the benefits set forth above. For example, FIG. 7 illustrates user 26 and rows of vehicles 22 and 24 similar to those in FIGS. 3a–3b. Each vehicle includes a security module with an improved receiver 68, wherein the sensitivity range of the receiver has been adjusted so that receiver 68 only responds to transmitters that are immediately proximate to the receiver 68. Assume that user 26 has a prior art standard range transmitter 70 and desires to disarm security module 24b' of vehicle 24b. User 26 may actuate transmitter 70 from a substandard distance 32 from vehicle 24b and only security module 24b' will respond. As a final example, systems (e.g., dip switches) other than those described are also known in the art for "programming" a code to more than one vehicle security system receiver. Still other examples will be apparent to, or determinable by, a person skilled in the art, all of which fall within the invention as defined by the following claims.

What is claimed is:

1. A method of selectively controlling a vehicle alarm system comprising a transmitter and a security module responsive to a control code from said transmitter, the method comprising the steps of:

adjusting a variable feature of said transmitter to define a first predetermined distance;

from a transmitter having a sufficient power source, transmitting a first control code within said first predetermined distance with said transmitter;

after said transmitting step, responding to said first control code with said security module only if said security module is within said first predetermined distance of said transmitter, wherein said first predetermined distance is a first short distance;

adjusting a variable feature of said transmitter to define a second predetermined distance;

programming said security module to respond to a second control code and not to respond to said first control code;

transmitting said second control code within said second predetermined distance with said transmitter; and responding to said second control code from said transmitter with said security module only if said security module is within said second predetermined distance of said second transmitter, wherein said second predetermined distance is a second distance which exceeds said first short distance.

2. The mehod of claim 1 wherein said first short distance comprises a range of zero to six feet.

3. A method of selectively controlling a vehicle alarm system, comprising the steps of:

first, adjusting a variable feature of a first transmitter to define a first short distance;

second, from said first transmitter having a sufficient power source, communicating a first control code said first short distance;

third, receiving said first control code with a receiver and responding to said first control code only if said receiver is within said first short distance of said transmitter;

fourth, programming said receiver to respond to a second control code and not respond to said first control code;

fifth, from a second transmitter having a sufficient power source, communicating said second control code a second distance which is longer than said first short distance; and sixth, receiving said second control code with said receiver and responding to said second control code if said receiver is within said second distance Of said second transmitter.

4. The method of claim 3 and further comprising the step of adjusting a variable feature of said transmitter to define said first short distance between a range of zero to six feet.

5. A method of securing a plurality of vehicles, comprising the steps of:

attaching a security module receiver in each of said plurality of vehicles;

programming each said security module receiver to respond to a common code;

transmitting said common code from a first transmitter located at a first point;

selectively responding to said common code from said first transmitter wherein only security module receivers within a first short distance from said first point respond to said common code from said first transmitter;

programming a selected security module receiver of one of said plurality of vehicles to respond to a unique code and not respond to said common code;

transmitting said unique code from a second transmitter located at a second point; and responding to said unique code by said selected security module receiver, wherein said selected security module receiver responds within a second distance which is longer than first short distance from said second point.

6. The method of claim 5 and further comprising the step of adjusting a variable feature of said first transmitter to define said first short distance.

7. The method of claim 5 and further comprising the step of adjusting a sensitivity range of said receiver to define said first short distance and said second distance.

8. The method of claim 5 wherein said first short distance comprises a range of zero to six feet.

9. The method of claim 5 wherein said second distance comprises a range of twenty to seventy-five feet.

10. A security system for use with a plurality of vehicles, comprising:

a first transmitter for receiving a sufficient power source and operable to transmit a first control code a first short distance;

a second transmitter for receiving a sufficient power source and operable to transmit a second control code a second distance which is longer than said first short distance; and a plurality of security modules for connecting to respective ones of said plurality of vehicles, wherein each of said plurality of security modules comprises a respective receiver selectively responsive to said first and second control codes.

11. The security system of claim 10 wherein each of said plurality of respective receivers is responsive to said first control code in a first mode, and responsive to said second control code in a second mode.

\* \* \* \* \*

UNITED STATES PATENT AND TRADEMARK OFFICE
CERTIFICATE OF CORRECTION

PATENT NO. : 5,602,535
DATED : February 11, 1997
INVENTOR(S) : William E. Boyles; Philip G. Burger; David S. Chang It is certified that error appears in the above-indentified patent and that said Letters Patent is hereby corrected as shown below:

Col. 7, ln. 5, delete "forsale", insert --for-sale--.

Col. 8, ln. 44, delete "$2^3$", insert --$2^{13}$--.

Col. 10, ln. 53, delete "distante", insert --distance--.

Col. 11, ln. 31, delete "Of", insert --of--.

Signed and Sealed this

Twentieth Day of May, 1997

Attest:

BRUCE LEHMAN

Attesting Officer

Commissioner of Patents and Trademarks